United States Patent [19]

Watanabe et al.

[11] Patent Number: 4,953,043
[45] Date of Patent: Aug. 28, 1990

[54] MAGNETIC RECORDING OR REPRODUCING APPARATUS WITH ERASING CAPABILITY

[75] Inventors: Kenji Watanabe; Yuji Sakaegi; Seiichi Ozaki, all of Kanagawa, Japan

[73] Assignee: Canon Kabushiki Kaisha, Tokyo, Japan

[21] Appl. No.: 300,341

[22] Filed: Jan. 23, 1989

[30] Foreign Application Priority Data

Jan. 29, 1988 [JP] Japan .................................. 63-018819

[51] Int. Cl.$^5$ .............................................. G11B 5/03
[52] U.S. Cl. ...................................................... 360/66
[58] Field of Search ............................. 360/66, 67, 68

[56] References Cited

U.S. PATENT DOCUMENTS

| | | | |
|---|---|---|---|
| 4,466,027 | 8/1984 | Howell et al. | 360/66 |
| 4,802,028 | 1/1989 | Ohnaka | 360/66 |
| 4,821,123 | 4/1989 | Ogura | 360/66 |

FOREIGN PATENT DOCUMENTS 0062414 5/1977 Japan .
8504277 9/1985 World Int. Prop. O. .

*Primary Examiner*—Vincent P. Canney
*Attorney, Agent, or Firm*—Robin, Blecker, Daley & Driscoll

[57] ABSTRACT

An erasing device of the invention is adapted to erase information signals recorded in concentric circular tracks formed on a disc-shaped magnetic recording medium. A reference signal is first counted. According to the counted value, a plurality of kinds of first count data are caused to generate. Further, of the plurality of kinds of first count data, the first count data which represents a predetermined counted value is used to generate a reference erasing signal. Meanwhile, as the disc-shaped magnetic recording medium rotates, pulses are formed in synchronism with the period of its rotation. By counting the pulses, a second count data corresponding to the counted value is formed. To generate a first erasing pulse signal and a second erasing pulse signal in response to the reference erasing signal, the first count data and the second count data are compared with each other in magnitude. Depending on the result of that comparison, each of the pulse duties of the first and second erasing pulse signals is controlled. And, the thus controlled-in-pulse-duty first and second erasing pulse signals are added to form an erasing signal which is then supplied to the magnetic head, when the information signals recorded in the tracks on the disc-shaped magnetic recording medium are erased. By such construction and arrangement of the means, though in a very simple form, it becomes possible to erase the information signals recorded in the tracks on the disc-shaped magnetic recording medium with high reliability and in a short time.

10 Claims, 5 Drawing Sheets

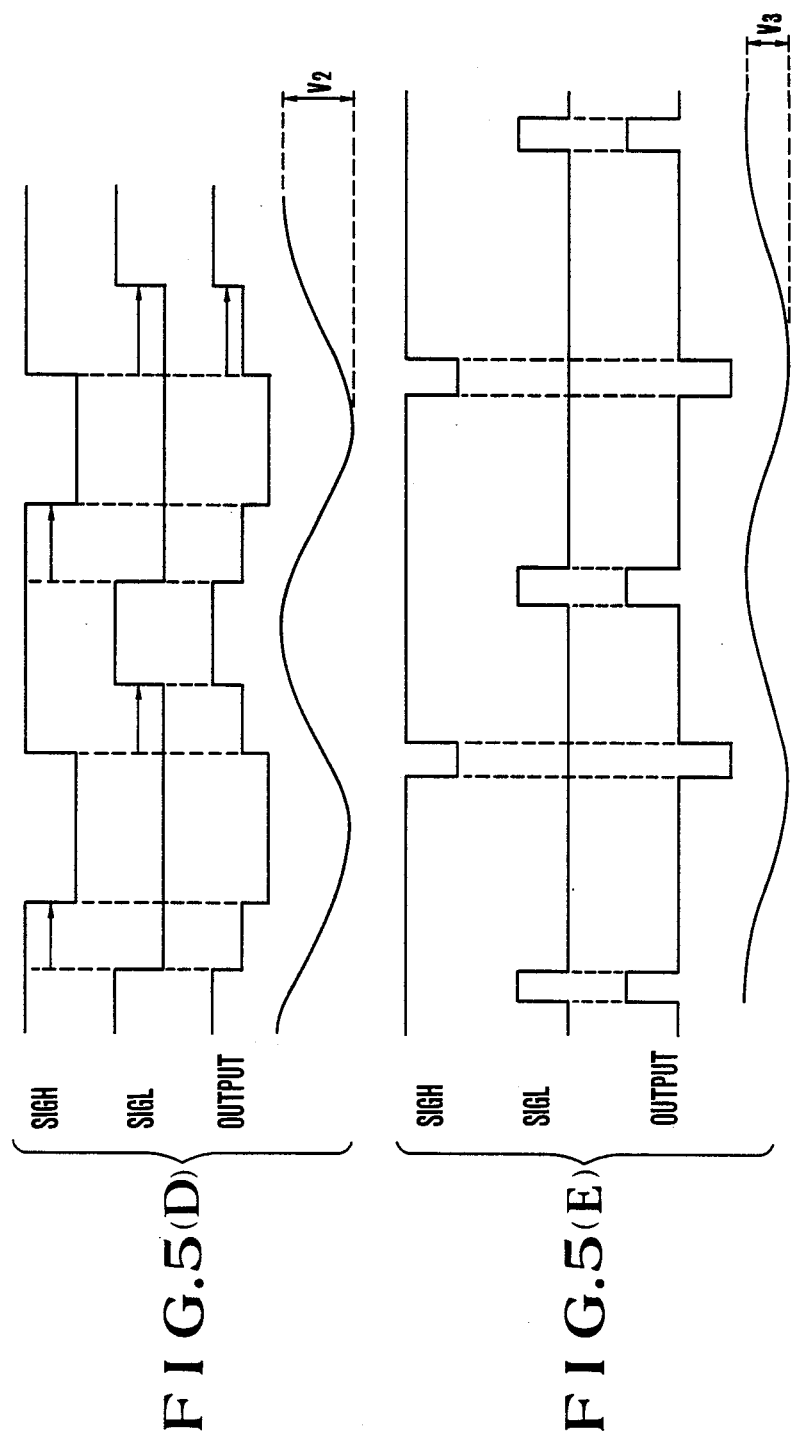

MAGNETIC RECORDING OR REPRODUCING APPARATUS WITH ERASING CAPABILITY

BACKGROUND OF THE INVENTION

1. Field to the Invention

This invention relates to an erasing device for erasing a signal recorded on a magnetic recording medium.

2. Description of the Related Art

In the past, for example, the still video systems, when erasing the recorded information, have generally adopted the DC erasing method in which the direction of flow of direct current to the magnetic head is changed in each rotation of the magnetic disc and the level of the current gets progressively lower, or the AC erasing method in which alternating current flows to the magnetic head. In this AC erasing method, an erasing signal is made progressively lower so as not to leave the direct current magnetization on the disc, as is well known in the art. Here, the conventional method of lowering the level of the erasing signal is disclosed in Japanese Laid-Open patent application No. Sho 62-26911, in which an output of a trapezoidal wave generating circuit and an erasing reference signal pass an amplitude modulator to produce a progressively lowering erasing signal.

Another erasing device in which the erasing is carried out by supplying alternating current whose polarity inverts in each one rotation of the magnetic disc to the magnetic head is disclosed in Japanese Laid-Open patent application No. Sho 61-175905.

A circuit embodying the above-described conventional example is shown in FIG. 1.

The circuit of FIG. 1 is an output impedance converting circuit in which in response to a circuit actuating pulse output from an input terminal 42 an erasing reference signal is output from a terminal 41 to an output terminal 43, and attenuation starts at a time when the actuating pulse is changed to a low level. In this circuit, the impedance of the output stage must be sufficiently small compared with the impedance of that circuit which is connected ahead of the output terminal 43. If it is insufficient, the erasing reference signal would be supplied to the output terminal 43, thus causing the circuit to be in the erasing state. For this reason, it is necessary to leave a current flowing to the output stage during all the time when the system is in operation. However, concerning the apparatus using a dry battery in driving the system, for example, the electronic still camera, electrical energy is very wastefully used up when a current supply to the circuit which does not partake the operation of the system is maintained during that operation.

Also, in connection with a block diagram mentioned in Japanese Laid-Open patent application No. Sho 61-175905, which is shown in FIG. 2, it should be pointed out that in the case of using the method described in Japanese Laid-Open patent application No. Sho 61-175905, there is a drawback that when the read means 51 and the memory means 52 are imparted into the circuit, its scale of construction is greatly increased.

SUMMARY OF THE INVENTION

This invention has its object to provide an erasing device which can overcome the above-described problems.

Another object of the invention is to provide an erasing device of very simplified structure while still permitting production of an optimum erasing signal.

Under such objects, according to the invention, as its one embodiment, the erasing device of the invention is a system for erasing information signals recorded in concentric circular tracks formed on a disc-shaped magnetic recording medium, being provided with:

reference signal generating means for generating a reference signal;

first counting means for counting the reference signal generated by the reference signal generating means to obtain a counted value, and for outputting in sequence a plurality of kinds of first count data according to the counted value;

reference erasing signal generating means for generating a reference erasing signal on the basis of first count data indicative of a predetermined counted value among the plurality of kinds of first count data output from the first counting means;

rotation period pulse generating means for generating a rotation period pulse synchronized with a rotation period of the disc-shaped magnetic recording medium;

second counting means for counting the rotation period pulse generated by the rotation period pulse generating means to obtain a counted value, and for outputting in sequence second count data according to the counted value;

erasing pulse signal generating means for generating a first erasing pulse signal and a second erasing pulse signal according to the reference erasing signal generated by the reference erasing signal generating means;

control means for comparing the first count data output from the first counting means and the second count data output from the second counting means with each other in magnitude to obtain a comparison result, and for controlling, according to the comparison result, each of pulse duties of the first erasing pulse signal and the second erasing pulse signal to be output from the erasing pulse signal generating means;

erasing signal forming means for adding the first erasing pulse signal and the second erasing pulse signal output from the erasing pulse signal generating means to form and output an erasing signal; and a magnetic head for erasing information signals recorded in the tracks formed on the disc-shaped magnetic recording medium by using the erasing signal output from the erasing signal forming means.

Another object of the invention is to provide an erasing device capable, in a short time with high efficiency, of erasing information signals recorded in the tracks on the magnetic recording medium.

Under such an object, according to the invention, as its one embodiment, the erasing device of the invention is a device for erasing information signals recorded in tracks formed on a magnetic recording medium, being provided with:

a magnetic head for tracing the tracks formed on the magnetic recording medium to erase the information signals recorded in the tracks;

a reference pulse signal generator for generating a reference pulse signal;

an n-bit pulse counter for counting the number of pulses of the reference pulse signal generated by the reference pulse signal generator to obtain a counted value, and for outputting in sequence $2^n$ (n being a positive integer) kinds of pulse count data according to the counted value;

a reference erasing signal generator for generating a reference erasing signal on the basis of one kind of pulse count data indicative of a predetermined counted value among the $2^n$ kinds of pulse count data output from the pulse counter;

a trace period pulse generator for generating a trace period pulse synchronized with a trace period for tracing the tracks of the magnetic head;

an m-bit trace number counter for counting, from a lapse of a predetermined time after the magnetic head has started tracing the tracks, the number of pulses of the trace period pulse generated by the trace period pulse generator to obtain a counted value, and for outputting in sequence $2^m$ (m being a positive integer) kinds of trace number data according to the counted value;

an erasing pulse signal generator for generating a first erasing pulse signal and a second erasing pulse signal according to the reference erasing signal generated by the reference erasing signal generator;

a control circuit for comparing the pulse count data output from the pulse counter and the trace number data output from the trace number counter with each other in magnitude to obtain a comparison result, and for controlling, according to the comparison result, each of pulse duties of the first erasing pulse signal and the second erasing pulse signal to be output from the erasing pulse signal generator; and an erasing signal forming circuit for adding the first erasing pulse signal and the second erasing pulse signal output from the erasing pulse signal generator to form an erasing signal, and for supplying the formed erasing signal to the magnetic head.

Other objects than those described above of the invention and its features will become apparent from the following detailed description of embodiments of the invention by reference to the drawings.

BRIEF DESCRIPTION OF THE DRAWINGS

FIGS. 5(A), 5(B), 5(C), 5(D) and 5(E) are wave forms of signals to explain the manner in which the circuit of FIG. 1 operates.

DETAILED DESCRIPTION OF THE PREFERRED EMBODIMENT

Figure 1:
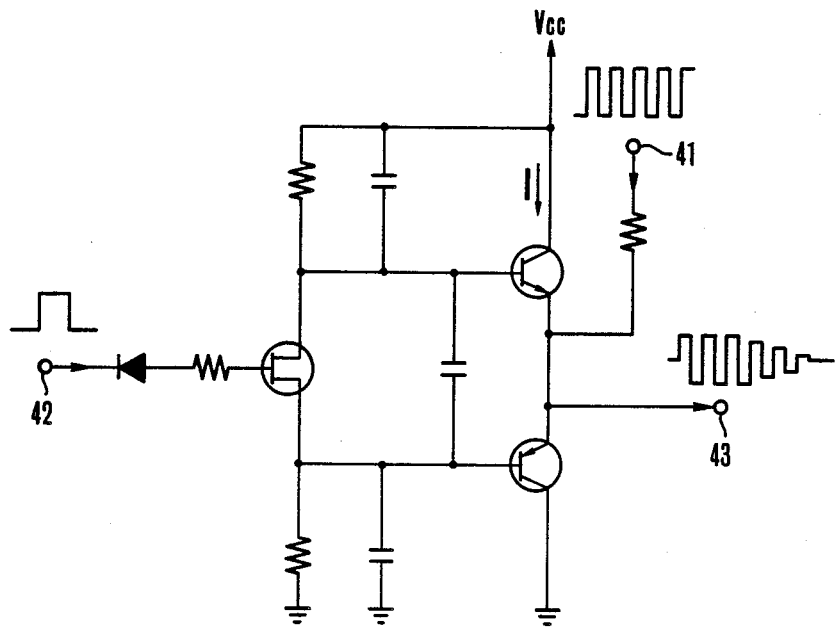
FIG. 1 is a block diagram illustrating the structure of the conventional amplitude limiter circuit.
Figure 2:
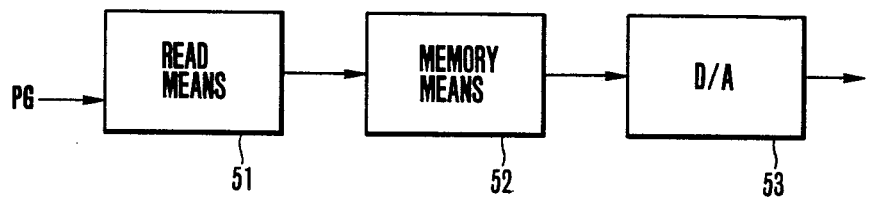
FIG. 2 is a block diagram illustrating the construction of the conventional erasing circuit.
Figure 3:
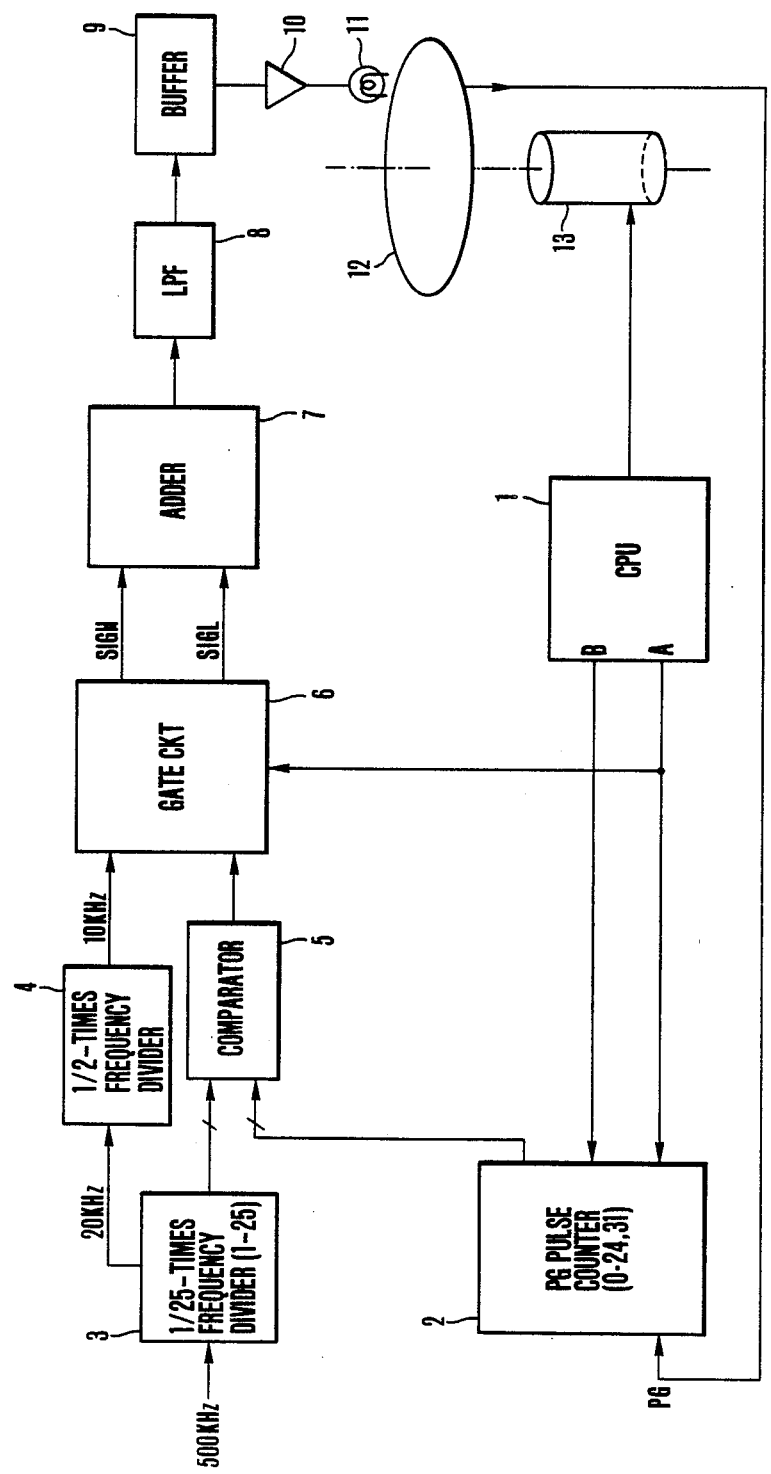
FIG. 3 is a block diagram illustrating the construction of an embodiment of the invention.
Figure 4:
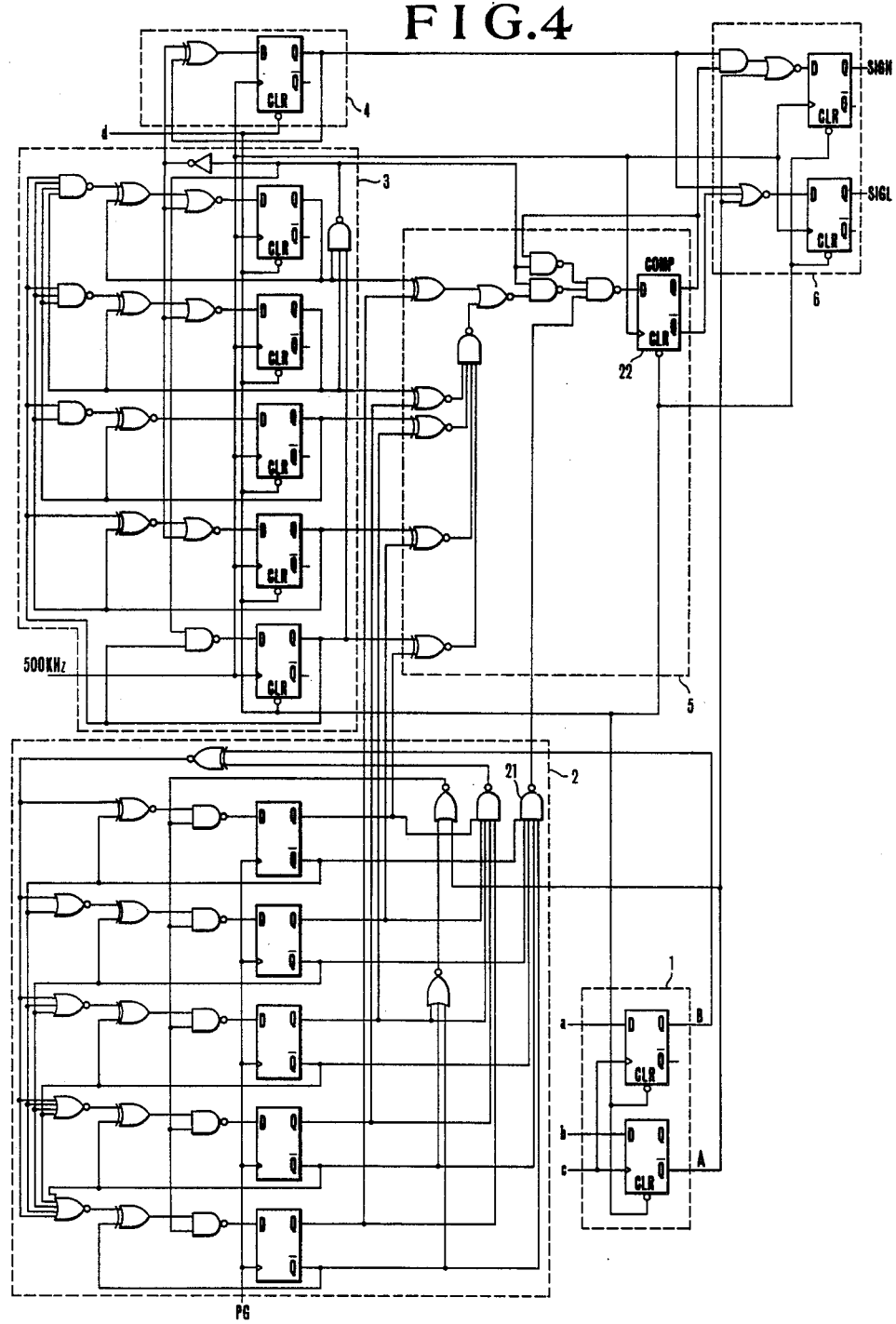
FIG. 4 is an electrical circuit diagram of a practical example of the construction and arrangement of the circuit elements of FIG. 3.

An embodiment of the invention is schematically shown in FIG. 3 and its concrete circuit is shown in FIG. 4.

In FIG. 3, an operation of the entirety of the erasing device is controlled by a CPU 1. Based on signals output from the CPU 1, a 5-bit PG pulse counter 2 counts PG pulses. The device further includes a 1/25-times frequency divider 3, a ½-times frequency divider 4 which halves the frequency of the output of the 1/25-times frequency divider 3, a comparator 5 for comparing the output of the PG pulse counter 2 with the output of the 1/25-times frequency divider 3, a gate circuit 6 for gating the output of the ½-times frequency divider 4 and the output of the comparator 5 on the basis of the signal output from the CPU 1, an adder 7 for adding and averaging two signals output from the gate circuit 6, and a low pass filter 8 for removing a high frequency component of the signal output from the adder 7. The signal which has passed the low pass filter 8 is supplied through a buffer 9 and an amplifier 10 to a magnetic head 11, so that signals which have already been recorded on the magnetic disc 12 which is rotated by a motor 13.

In the following, the operation of the invention is explained by using FIG. 4 and FIG. 5. Incidentally, the blocks or outputs denoted by the same symbols as those in FIG. 3 are assumed to operate or behave in a similar manner.

Figures 5A, 5B, 5C:
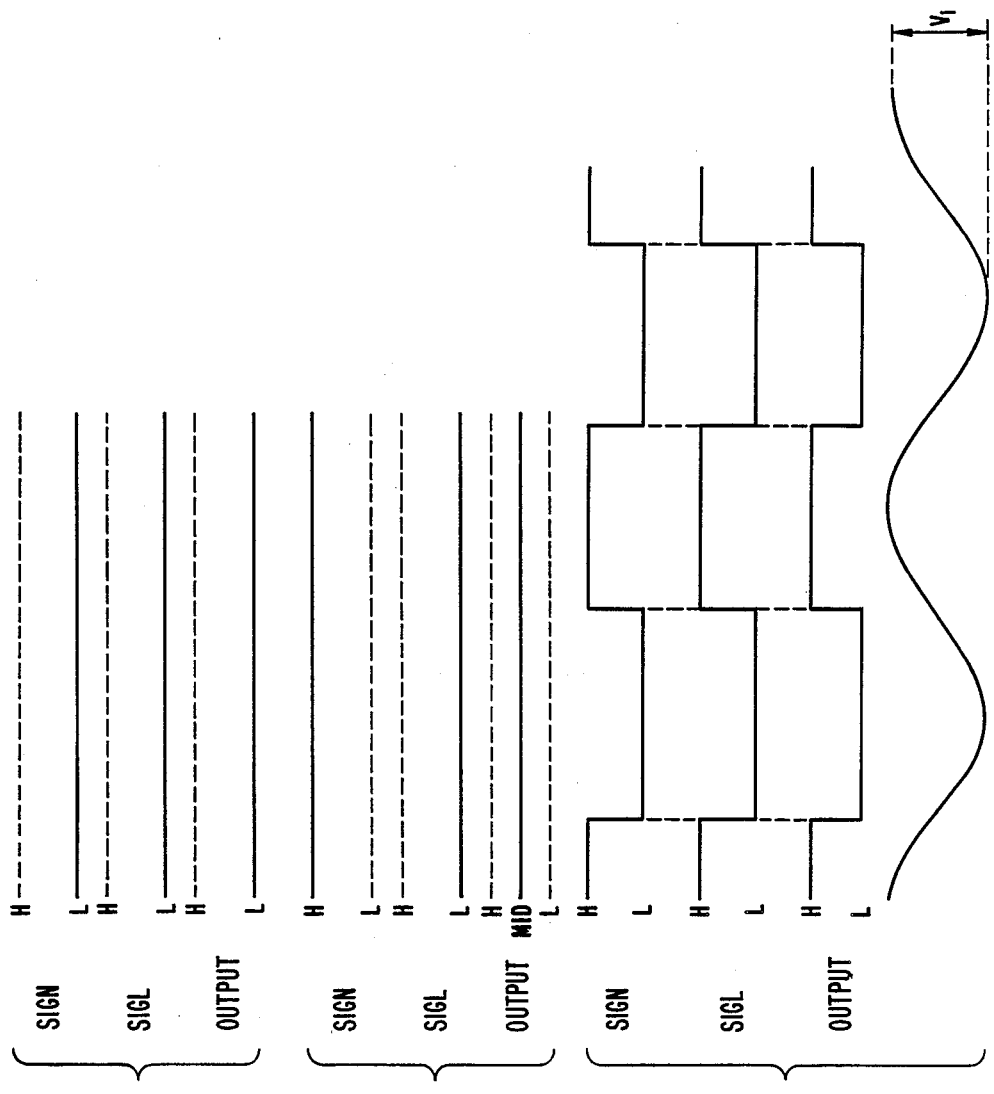

The control signal A output from the CPU 1 is first at a high level. The control signal B output from the CPU 1 is first at a low level. At this time, the gate circuit 6 comes into a closed state, so that, as shown in FIG. 5(A), the two signals SIGH and SIGL output from the gate circuit 6 is at a low level, and the signal output from the adder 7 is at a low level. If, in this state, a rotation position detecting signal which is generated each time the magnetic disc 12 makes one rotation, i.e., the PG pulse is input even only once, the PG pulse counter 2 is set to a counted value of "31" (=11111).

Next, when the signal A output from the CPU 1 comes to be at a low level according to signals (a, b, c, d in FIG. 4) supplied from a main CPU (not shown), the signal SIGH comes to be at a high level as shown in FIG. 5(B), causing the output of the adder 7 of FIG. 3 to take a middle potential MID. (It should be noted that the output of the adder 7 means an output obtained by adding the outputs SIGH and SIGL of the gate circuit 6 in the adder 7.) Since the signal B output from the CPU 1 at this time is at a low level, the counted value of the PG pulse counter 2 remains "31".

As the signal B output from the CPU 1 comes to be at a high level, when the PG pulse is supplied the PG pulse counter 2 increments the counted value from "31" to "0". When the counted value of the PG pulse counter 2 becomes "0", a comparator (COMP) 22 is set by a 5-input NAND gate 21 of FIG. 4, causing the signals SIGH and SIGL both to become a signal of about 10 KHz as shown in FIG. 5(C). It should be noted that so long as the signal B is at a high level, even if another PG pulse is supplied to the PG pulse counter 2, the PG pulse counter 2 does not carry out counting of the PG pulse, permitting this state to continue for a period in which the magnetic disc 12 makes, for example, 9 rotations.

Then, as the signal B output from the CPU 1 is changed to a low level by the main CPU (not shown), when the next PG is supplied, the PG pulse counter 2 counts up, outputting a 5-bit counted value data to the comparator 5. Meanwhile, the 1/25 times frequency divider 3 is supplied with a signal of about 500 KHz as a clock and supplies a 5-bit counted value of "1" to "25" to the comparator 5. On comparison of the output of the 1/25-times frequency divider 3 and the output of the PG counter 2 with each other in magnitude by the comparator 5, the output of the COMP 22 of FIG. 4 which has been set at the time of FIG. 5(C) decreases in duty as the counted value of the PG pulse counter 2 increases. In more detail, as shown in FIG. 5(D), as the PG pulse counter 2 counts up, the duties of the signals SIGH and SIGL output from the gate circuit 6 are changed as indicated by arrows shown in FIG. 5(D). As a result, the period for which the signal SIGH is at a high level gets longer, while the period for which the signal SIGL is at a low level gets longer.

And, by adding the two outputs output from the gate circuit 6 by the adder 7, the output of the adder 7 has a middle potential, and approaches a wave of vertically symmetrical impulse shape, as shown in FIG. 5(E). By filtering this output through the low pass filter 8, the high frequency component decreases. The erasing current which has passed the low pass filter 8 has its amplitude get progressively smaller ($V_1 > V_2 > V_3$) as shown in FIGS. 5(C), 5(D) and 5(E), or attenuate. Therefore, as the number of impulses increases, the level of the erasing signal decreases until, for example, the 25th PG pulse is supplied to the PG pulse counter 2. At this time, the output of the PG pulse counter 2 changes from "24" to "31", causing the signal SIGH to be at a high level, and the signal SIGL to be at a low level, which in turn causes the output of the adder 7 to be at the middle potential. By the operation above, an erasing signal which gradually attenuates can be obtained.

It should be noted that though in this embodiment the PG pulse counter is used for counting up the PG pulses, this may be replaced by a register into which the CPU can write data each time the PG pulse is input.

Also, in this embodiment, the signal of 10 KHz is obtained by frequency-dividing the signal of 500 KHz. If the latter signal of 500 KHz is obtained by dividing 3.58 MHz (=fsc) by 7, the former signal of 10KHz is caused to have a phase difference of 225° for every one PG pulse. The consideration on this phase difference is mentioned in Japanese Laid-Open patent application No. Sho 62-125504, so it is omitted here.

In such a manner, from the combinations of the low frequency waves having appropriate phase differences and the frequencies to be used in the reference signal, the frequency division ratio, the attenuation time for the embodiment of the invention are determined as follows:

For example, assuming that the frequency of the reference signal for the system is 14.31818 MHz, in synchronism with which the disc is rotating, then if the signal of 14 MHz is divided in frequency by about 650 to 1,500, a signal having a frequency of 10 KHz to 20 KHz is obtained. Now, suppose this frequency division factor N varies in a range. Of the frequencies equal to 1/N-times the frequency of 14 MHz, ones which lead to phase deviations of 30° to 150°, 210° to 330° in a period of 1V (where 1V represents one rotation of the disc) are chosen. For example, when N=700, the phase difference becomes 90°. Therefore, one track on the disc can be erased in about 2-4 rotations of the disc. But, when N=650, the phase difference becomes 180°. This is not suitable. Incidentally, in this embodiment, N=1400, and the phase difference is 225°.

Next, N is to be factorized into prime numbers. For this, the N must be an even number, because, as shown in FIG. 3, division by a factor of "2" takes place at last. To factorize N into prime numbers, where, for example, N=1400, 1400=2×2×2×5×5×7 results. Out of the first occurrence factors of "2", one is removed to get a divisor: 2×2×5×5×7, based on which the frequency division factor for a frequency divider to be used is determined. For example, in this embodiment, the frequency obtained by dividing 14 MHz by a factor of "4" coincides with fsc. Therefore, the frequency obtained by dividing 3.58 MHz by a factor of "7" has been used for more division by a factor of "25". This result may otherwise be obtained by dividing 3.58 MHz first by a factor of "5" and then by a factor of "35". In this case, because the attenuation time becomes equal to a period of 35 V, it is required to use one more counter which is of 7 bits. But there is not essential difference from the invention. Thus, many variations of the embodiment of the invention are possible when the difference values of the reference signal frequency, phase difference and frequency division factor (=attenuation time) are combined.

As has been described above, according to this invention, by a circuit of very simple form, a signal consisting of a continuous oscillation followed by an attenuation oscillation whose amplitude gradually attenuates, finally becoming substantially zero can be obtained. Nevertheless, without having to leave points unerased, erasing can be carried out one track by track with high reliability and in a short time with good efficiency.

What is claimed is:

1. An erasing device for erasing information signals recorded in concentric circular tracks formed on a disc-shaped magnetic recording medium, comprising:
   (A) first count data generating means for counting reference signals and for outputting in sequence first count data;
   (b) reference erasing signal generating means for generating a reference erasing signal on the basis of first count data indicative of a predetermined counted value among the first count data outputted from the first count data generating means;
   (C) second count data generating means for counting number of rotation of said disc-shaped magnetic recording medium and for outputting in sequence second count data according to the counted value;
   (D) comparing means for comparing the first count data outputted from said first count data generating means with the second count data outputted from said second data generating means;
   (E) erasing pulse signal generating means for generating a first erasing pulse signal and a second erasing pulse signal according to the reference erasing signal generated by said reference erasing signal generating means, and for controlling pulse duties of said first erasing pulse signal and said second erasing pulse signal and a comparison result of said comparing means and then outputting the erasing pulse signals;
   (F) erasing signal generating means for adding the first erasing pulse signal and the second erasing pulse signal outputted from said erasing pulse signal outputted from said erasing pulse signal generating means to generate an erasing signal; and
   (G) a magnetic head for erasing information signals recorded in the tracks on the disc shaped magnetic recording medium by using the erasing signal outputted from said erasing signal generating means.

2. A device according to claim 1, wherein said reference erasing signal generating means is arranged to generate a reference erasing signal synchronized with an output timing of the first count data indicative of a predetermined counted value outputted from said first count data generating means.

3. A device according to claim 1, wherein said erasing pulse signal generating means is arranged to control a rise timing of the first erasing pulse signal and a fall timing of the second erasing pulse signal in according with a result of comparison of said comparing means, thereby controlling the pulse duties.

4. A device according to claim 1, wherein said erasing signal generating means includes:
   (A) an adder for adding the first erasing pulse signal and the second erasing pulse signal outputted from said erasing pulse signal generating means to output a sum signal; and
   (B) a low-pass filter for removing a high frequency component of the sum signal output from said adder.

5. An erasing device for erasing information signals recorded in tracks formed on a magnetic recording medium, comprising:
   (A) a magnetic head for tracing the tracks formed on the magnetic recording medium to erase the information signals recorded in the tracks;
   (B) pulse count data generating means for counting reference pulse signals and for outputting in sequence $2^n$ (n: positive integer) kinds of pulse count data according to a counted value;
   (C) a reference erasing signal generator for generating a reference erasing signal on the basis of pulse count data indicative of a predetermined value among the pulse count data outputted from said pulse count data generating means;
   (D) trace number data generating means for counting, from a lapse of a predetermined time after the magnetic head has started tracing the tracks, the number of tracing effected by said magnetic head and for outputting in sequence $2^m$ (m: a positive integer) kinds of trace number data according to the counted value;
   (E) comparing means for comparing the pulse count data outputted from said pulse count data generating means with the trace number data outputted from said trace number data generating means;
   (F) erasing pulse signal generating means for forming a first erasing pulse signal and a second erasing pulse signal according to the reference erasing signal generated by said reference erasing signal generator and for controlling pulse duties of said first erasing pulse signal and said second erasing pulse signal, according to a result of comparison of said comparing means and then outputting the erasing pulse signals; and
   (G) an erasing signal generating means for adding the first erasing pulse signal and the second erasing pulse signal outputted from said erasing pulse signal generating means to form an erasing signal, and for supplying the formed erasing signal to the magnetic head.

6. A device according to claim 5, wherein the magnetic recording medium includes a magnetic disc, and wherein said magnetic disc has information signals recorded in concentric circular tracks formed thereon.

7. A device according to claim 5, wherein said trace number data generating means is arranged to count, from the time when said magnetic head has made k (k: a positive integer) rotations on the tracks after said magnetic head has started tracing the tracks, the number of tracing said track by said magnetic head.

8. A device according to claim 5, wherein said reference erasing signal generating means is arranged to generate a reference erasing signal synchronized with an output timing of pulse count data indicative of a predetermined counted value outputted from said pulse count data generating means.

9. A device according to claim 5, wherein said erasing pulse signal generating means is arranged to control, according to the comparison result of said comparing means, a rise timing of the first erasing pulse signal and a fall timing of the second erasing pulse signal to thereby control pulse duties.

10. A device according to claim 5, wherein said erasing signal forming circuit includes:
   (A) an adder for adding the first erasing pulse signal and the second erasing pulse signal outputted from said erasing pulse signal generating means to output a sum signal; and
   (B) a low-pass filter for removing a high frequency component of the sum signal output from said adder.

* * * * *